(12) United States Patent
Kafka (10) Patent No.: US 7,551,725 B2
(45) Date of Patent: Jun. 23, 2009

(54) SYSTEMS AND METHODS FOR PROVIDING CALL MONITORING SERVICE FOR MULTIPLE TELECOMMUNICATIONS UNITS

(75) Inventor: Henry Kafka, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 775 days.

(21) Appl. No.: 11/217,174

(22) Filed: Sep. 1, 2005

(65) Prior Publication Data
US 2007/0047698 A1 Mar. 1, 2007

(51) Int. Cl.
H04M 1/24 (2006.01)
H04M 3/08 (2006.01)
H04M 3/22 (2006.01)

(52) U.S. Cl. ............ 379/32.01; 379/88.12; 379/88.18; 379/93.21; 379/100.12; 455/412.2; 455/413

(58) Field of Classification Search ............ 379/32.01, 379/32.04, 67.1, 88.12, 88.13, 88.17, 88.18, 379/88.22, 88.23, 93.09, 93.11, 93.21, 100.05, 379/100.06, 100.12, 207.04, 205.05, 215.01; 455/403, 412.1, 412.2, 413, 420, 552.1
See application file for complete search history.

(56) References Cited

U.S. PATENT DOCUMENTS

| | | | |
|---|---|---|---|
| 4,695,903 | A | 9/1987 | Serap et al. |
| 5,217,088 | A | 6/1993 | Dallman |
| 5,630,067 | A | 5/1997 | Kindell et al. |
| 5,963,864 | A | 10/1999 | O'Neil et al. ............ 455/445 |
| 6,021,176 | A * | 2/2000 | McKendry et al. ......... 379/35 |
| 6,058,178 | A | 5/2000 | McKendry et al. |
| 6,655,580 | B1 | 12/2003 | Ergo et al. |
| 6,885,311 | B2 | 4/2005 | Howard et al. |
| 7,039,395 | B2 | 5/2006 | Kundaje et al. |
| 2003/0002645 | A1 * | 1/2003 | Worsham et al. ......... 379/211.03 |
| 2003/0179865 | A1 * | 9/2003 | Stillman et al. .......... 379/88.18 |
| 2006/0067300 | A1 | 3/2006 | Poustchi et al. |
| 2006/0104431 | A1 | 5/2006 | Emery et al. |
| 2006/0153353 | A1 * | 7/2006 | O'Neil .................. 379/211.02 |

OTHER PUBLICATIONS

U.S. Appl. No. 11/218,010, filed Sep. 1, 2005, entitled: "Systems and Methods for a Telecommunications Extension Service for Multiple Telecommuncations Units" for Henry Kafka.

(Continued)

*Primary Examiner*—Binh K Tieu
(74) *Attorney, Agent, or Firm*—Myers Bigel Sibley & Sajovec (57) ABSTRACT

Systems and methods provide a call monitoring service for multiple telecommunications units. When an incoming communication directed to a subscriber's simultaneous ring number is received, outgoing communications are placed to each of the telecommunications units associated with the subscriber's simultaneous ring number. A determination is made as to whether the incoming communication should be routed to the voice mail system. If the incoming communication should be routed to the voice mail system and the call monitoring service is activated, a communication between the calling party and the voice mail system is established. A determination is made as to whether a user of one of the telecommunications units takes an action to connect to the communication between the calling party and the voice mail system. If an action is detected, then a communication between the calling party, the voice mail system, and the telecommunications unit is established.

20 Claims, 6 Drawing Sheets

OTHER PUBLICATIONS

Office communication dated Dec. 6, 2007 in U.S. Appl. No. 11/218,010.

Official Action dated Sep. 27, in U.S. Appl. No. 11/218,010.

Office Action dated Jun. 27, 2008 for related U.S. Appl. No. 11/218,010.

Office Action dated Nov. 13, 2008 for related U.S. Appl. No. 11/218,010.

* cited by examiner

SYSTEMS AND METHODS FOR PROVIDING CALL MONITORING SERVICE FOR MULTIPLE TELECOMMUNICATIONS UNITS

FIELD OF THE INVENTION

The present invention relates generally to telecommunications services and, more particularly, to systems and methods for providing call monitoring service for multiple telecommunications units.

BACKGROUND OF THE INVENTION

Increasingly in today's society, a need exists for individuals to "stay in touch," whether it is with business contacts, co-workers, friends, or family members. Primary avenues for individuals to stay in touch are the telecommunications networks, both wireline and wireless. However, if an individual is not sufficiently proximate to their telecommunication device, the individual cannot answer an incoming call before it stops ringing, in which case the call often goes unanswered. To prevent missing calls, individuals may subscribe to a so-called "simultaneous ring" telephone service. According to the typical simultaneous ring service, when a called party receives an incoming call directed to a directory number associated with the called party, telecommunications units associated with the directory number ring simultaneously, allowing the called party to answer the most accessible phone. For example, a person may have the simultaneous ring service established for her home telephone, such that whenever a calling party calls her at home, not only does her home telephone ring, but her wireless telephone also rings However, if none of the telecommunications units simultaneously rung is answered, or if all of the telecommunications units are busy, then the incoming call is forwarded to a network-based voice mail system shared by the telecommunications units. Unlike conventional telephone answering machines which allow those in close proximity of the answering machine to listen to incoming messages as they are being recorded on the answering machine, calls forwarded to a network-based voice mail system are routed directly to the voice mail system, without allowing any monitoring or screening of the incoming message as the message is being saved at the voice mail system. Therefore, users of the telecommunications units simultaneously rung must wait until the message has been recorded by the calling party and then call into the voice mail system to retrieve the message.

SUMMARY OF THE INVENTION

The present invention is directed to systems and methods for providing a call monitoring service to multiple telecommunications units. A subscriber to voice mail services contacts her telephone services provider to request the call monitoring service. Once the subscriber is validated as an authorized subscriber, and provides a list of numbers to be simultaneously rung, and is afforded the call monitoring service, the subscriber may activate the call monitoring service. Through the call monitoring service, a user at any of the telecommunications units associated with a number on the list of numbers provided by the subscriber may screen or monitor calls directed to a network-based voice mail system when an incoming communication is received.

According to one embodiment of the present invention, the system includes a programmable service means, such as a control Service Switching Point ("SSP"), associated with the subscriber's simultaneous ring number. A control SSP receives an incoming call from a calling party directed to the simultaneous ring number, which is associated with a plurality of telecommunications units to be simultaneously rung. Once the control SSP receives the incoming communication, the control SSP queries a programmable determination means, such as a Service Control Point ("SCP"), for processing instructions for the incoming communication.

In response to the query, the SCP provides the control SSP instructions to place outgoing communication requests to each of the telecommunications units associated with the subscriber's simultaneous ring number. Once the control SSP receives the processing instructions from the SCP, the control SSP places outgoing communication requests to each of the telecommunications units. If the control SSP determines that all of the telecommunications units are busy or that all of the outgoing communication requests have timed-out before being answered, then the incoming call is routed to the voice mail system via the control SSP. At the control SSP, a query is triggered to the SCP, where a determination is made as to whether the call monitoring service is activated for the telecommunications units associated with the subscriber's simultaneous ring number.

If call monitoring is activated, the SCP collects information regarding the calling party, the subscriber, the voice mail system, and call processing instructions and sends a message to the control SSP including the information and call processing instructions. Upon receiving the message from the SCP, the control SSP forwards the incoming call to the voice mail system, which receives the call and begins providing voice mail services. The voice mail system sends a notification to the control SSP regarding the status of the communication between the calling party and the voice mail system. In response to receiving the notification, the control SSP sends notification via signaling means to each of the telecommunications units associated with the subscriber's simultaneous ring number regarding the status of the communication between the calling party and the voice mail system and the option to monitor the communication between the calling party and the voice mail system.

In response to receiving the notification, users of the telecommunications units may take actions to connect to the communication between the calling party and the voice mail system. If a user of a first telecommunications unit associated with the subscriber's simultaneous ring number takes an action to connect to the communication, a communication between the calling party, the voice mail system, and the first telecommunications unit is set up. Accordingly, the user of the first telecommunications unit may listen to the voice mail message being recorded by the calling party in order to screen or monitor the call. If a user of a second telecommunications unit associated with the subscriber's simultaneous ring number takes an action to connect to the communication, then the second telecommunications unit is connected to the communication between the calling party, the voice mail system, and the first telecommunications unit so that the users of the first and second telecommunications units may listen to the voice mail message being recorded by the calling party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of embodiments of the present invention is made with reference to the above-described drawings wherein like numerals refer to like parts or components throughout the several figures. The present invention is directed to systems and methods for providing call monitoring service for multiple telecommunications units.

Operating Environment

Figure 1:
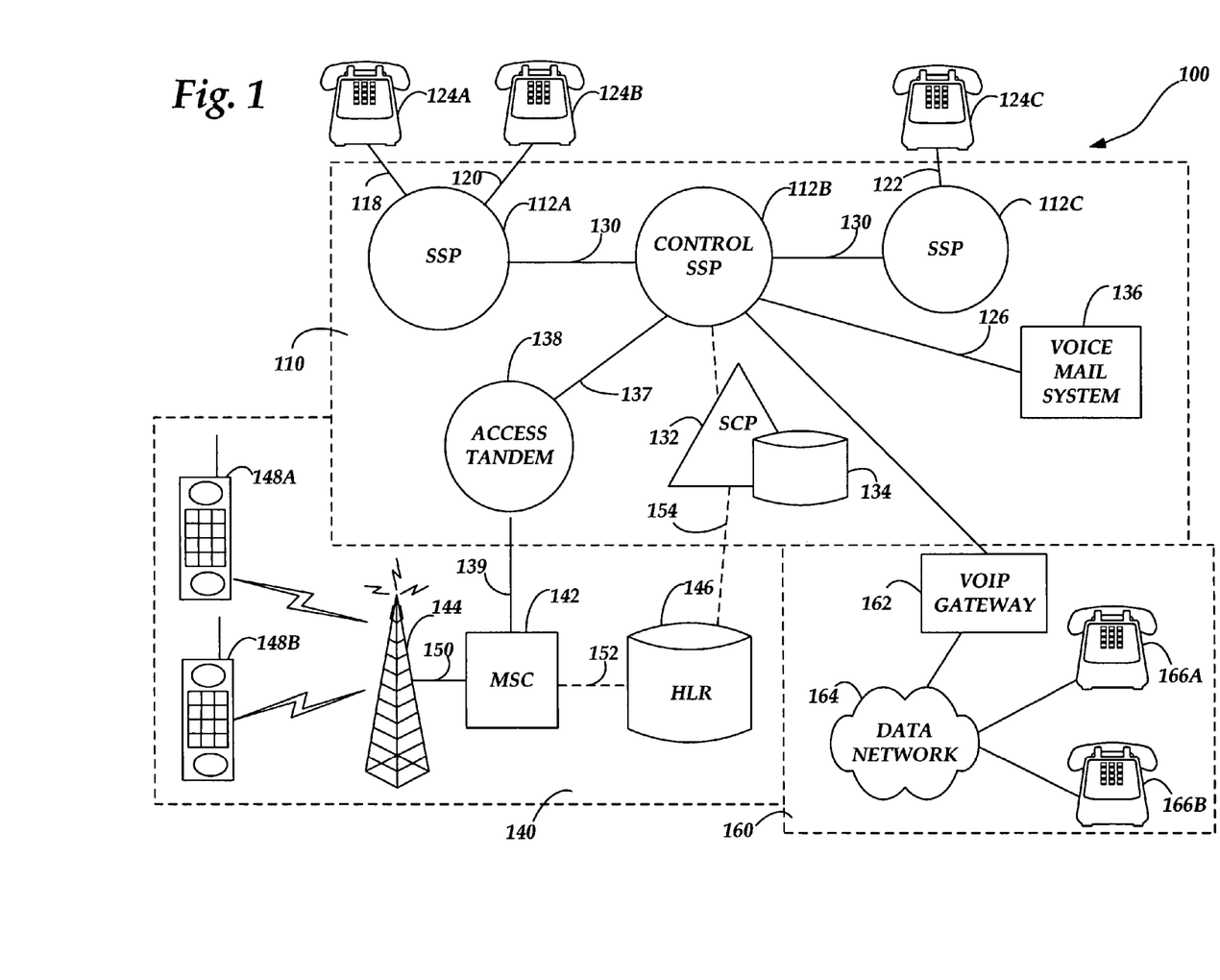
FIG. 1 is a block diagram illustrating components of a wireline and wireless communications network that provides an operating environment for the present invention.

FIG. 1 is a block diagram of a system 100 for providing a call monitoring service for multiple telecommunications units including components of a wireline telephone network 110, a wireless telephone network 140, and an Internet Protocol ("IP") network 160 that provide an exemplary operating environment for the present invention. The Public Switched Telephone Network ("PSTN") that evolved in the 1980s incorporated an Advanced Intelligent Network ("AIN"). FIG. 1 is illustrative of at least a part of the AIN of a typical local exchange carrier integrated with components of the wireless telephone network 140. The AIN uses the Signaling System 7 ("SS7") network for signal or system control message transport. The components thereof are well known to those skilled in the art. The operation of many of the components of the AIN is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical PSTN. As shown in FIG. 1, each central office may include an electronic switch known to those skilled in the art as a Service Switching Point ("SSP"). These are indicated in FIG. 1 as SSPs 112A-112C. The number of SSPs depends on the number of subscribers to be served by the PSTN. The terms "SSP" and "switch" are used interchangeably hereinafter and are understood to refer to a telecommunications switch having AIN capability and which may be utilized for connecting voice channel circuits, including voice channel lines, such as trunk circuits 130.

As shown in FIG. 1, the SSPs 112A-112C have a plurality of subscriber lines 118, 120, and 122 connected thereto. Each of the subscriber lines 118, 120, and 122 is connected to a terminating piece or pieces of customer premises equipment that are represented by wireline telephones 124A-124C. The SSPs 112A-112C are connected by a plurality of the trunk circuits 130. The trunk circuits 130 are the voice path trunks that interconnect the SSPs 112A-112C and are the voice path trunks over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 118 shown in FIG. 1.

Much of the intelligence, and the basis for many of the enhanced features of the network, resides in a local Service Control Point ("SCP") 132. As is known to those skilled in the art, SCPs, such as the SCP 132, are physically implemented by relatively powerful fault tolerant computers. Among the functions performed by the SCP 132 is maintenance of network databases used in providing enhanced services. SCPs normally implement high volume routing services, such as call forwarding and 800 number translation and routing. In addition, another function of the SCP 132 is hosting of a network database 134, which may store subscriber information, such as subscriber call management profiles, used in providing enhanced calling services.

According to one embodiment of the present invention, the network database 134 stores a list of numbers to be simultaneously rung when a telephone call directed to a subscriber's directory number designated as the simultaneous ring number is received. According to this embodiment of the present invention, the numbers in the list may correspond to multiple wireline, wireless, and IP telecommunications units. In particular, the subscriber provides the telephone numbers for the telecommunications units that are to be simultaneously rung when a call directed to a simultaneous ring number associated with the subscriber is received. As discussed above, these numbers may be stored in the network database 134 and retrieved when a call is directed to the subscriber's simultaneous ring number. In one embodiment of the present invention, the simultaneous ring number may be a telephone number that is not associated with any of the subscriber's telecommunications units. In another embodiment, the simultaneous ring number may be the telephone number associated with one of the subscriber's telecommunications units. Moreover, the subscriber may store, in the network database 134, a call monitoring directory number associated with a call monitoring service call from the control SSP 112B for presentation with a distinctive ring anytime a call from the call monitoring directory number is received, as described in greater detail below with reference to FIGS. 2A-2E. The subscriber may identify the list of numbers as well as call monitoring directory numbers to receive distinctive rings through the use of a voice driven administration system or through a World Wide Web ("WWW") site.

In order to keep the processing of data and calls as simple as possible at the switches, such as at the SSPs 112A-112C, a set of triggers may be defined at the SSPs for each call. A trigger in an AIN is an event associated with a particular subscriber line that generates a query that is sent from the SSP servicing the particular subscriber line to the SCP 132. The triggers may be originating triggers for calls originating from the subscriber premises or terminating triggers for calls terminating at the subscriber premises. A trigger causes a message in the form of a query to be sent from one of the SSPs 112A-112C to the SCP 132.

The SCP 132 in turn interrogates the database 134 to determine whether some customized call feature or enhanced service should be implemented for the particular call, or whether conventional dial-up telephone service should be provided. The results of the database inquiry are sent back from the SCP 132 to the SSP that sent the query. The return message from the SCP 132 includes instructions to the SSP regarding how to process the call. The instructions may be to take some special action as a result of a customized calling service or enhanced feature. For example, if a list of telecommunications units has been identified to be simultaneously rung, then the return message from the SCP 132 may include instructions for the SSP to route the call to each telephone number associated with the plurality of telecommunications units. Additionally, the return message from the SCP 132 may include instructions for the SSP to place a call monitoring service call to the telecommunications units to notify users of the telecommunications units of a communication between a calling party and a voice mail system associated with the telecommunications units. Moreover, the return message from the SCP 132 may simply be an indication that there is no entry in the database 134 that indicates anything other than conventional telephone service should be provided for the call. The query and return messages may be formatted, for example, according to conventional SS7 Transaction Capabilities Application Part ("TCAP") formats. U.S. Pat. No. 5,438,568, which is incorporated herein by reference, discloses additional details regarding the functioning of a conventional AIN.

The wireless network 140 includes a Mobile Switching Center ("MSC") 142, a Base Transceiver Station ("BTS") 144, and a Home Location Register ("HLR") 146. The MSC 142 is in communication with one or more wireless telecommunications units 148A and 148B, such as a wireless telephone as illustrated in FIG. 1, via the BTS 144. The BTS 144 may communicate with the wireless telecommunications units 148A-148B according to an air-interface communication scheme such as but not limited to, for example, AMPS (ANSI-553), TDMA (IS 136), CDMA (IS-95), or GSM. The BTS 144 may be in communication with the MSC 142 via the communications link 150. The MSC 142 is an automatic switching system in a wireless telecommunications network that acts as the interface for subscriber traffic between the wireless network 140 and the wireline network 110 or other MSCs in the same or other wireless networks. The MSC 142 performs the same general function as the SSP in a wireline based system. In addition, the MSC 142 supports incoming calls through a radio telecommunications front-end, as well as handoff and roaming functions. Accordingly, the MSC 142 may include wireless Intelligent Network ("IN") functionality for detecting originating and terminating triggers.

The MSC 142 may be in communication with the HLR 146 via a communications link 152 which may, for example, be an SS7 signaling protocol link. The HLR 146 is a location register to which the user identity of a wireless telecommunications unit, such as the wireless telephone 148A, is assigned for record purposes. The HLR 146 may register subscriber information relating to the wireless telecommunications units such as, for example, profile information, current location, and authorization period. When the MSC 142 detects a wireless telecommunications unit entering the MSC's 142 service area, the MSC 142 performs a registration process that includes requesting subscriber profile information from either the HLR 146 or a visitor location register ("VLR") (not shown), depending upon whether the wireless telephone 148A is within its home location or within a visitor location. Typically for integrated wireless networks, the VLR assigned to the service area of a visiting wireless subscriber is updated with information from the HLR associated with the wireless subscriber's wireless service provider ("WSP"). Accordingly, the MSC 142 servicing a particular area has access to information regarding each of the wireless users presently in its service area.

The wireline network 110 additionally includes an access tandem 138, which provides a switching interface between the wireline network 110 and the wireless network 140. The access tandem 138 may be in communication with the MSC 142 via a communications link 139, which may be, for example, a trunk circuit or an ISDN circuit. In addition, the access tandem 138 may be in communication with one or more of the SSPs (such as the SSP 112B as illustrated in FIG. 1) via communications links 137, which may be, for example, trunk circuits. In addition, the SCP 132 may be in communication with the HLR 146 of the wireless network 140 via a communications link 154 employing, for example, the IS-41 signaling protocol. For clarity in FIG. 1, communications links that are used exclusively for signaling (e.g., no call data) are illustrated with dashed lines, and communications links that transfer signaling and/or call data are illustrated with solid lines.

The IP network 160 includes a Voice over Internet Protocol ("VoIP") gateway 162 and a data network 164. The VoIP gateway 162 is in communication with one or more telecommunications units 166A and 166B, such as an IP telephone as illustrated in FIG. 1, via the data network 164. The data network 164 may be a wired or a wireless data network. The VoIP gateway 162 provides signaling exchanges between the wireline network 110 and the IP network 160 and enables end-to-end call setup and tear down across the two networks. In addition, the VoIP gateway 162 exchanges voice and other communications between the wireline network 110 and the IP network 160. The VoIP gateway 162 of the IP network 160 is in communication with the control SSP 112B of the wireline network 110.

As shown in FIG. 1, a voice mail system 136 is functionally connected to the SSP 112B and is a component of the network 110. Calls are routed to and from the voice mail system 136 at the control and direction of the network 110 via such components as the SCP 132. According to one embodiment, the voice mail system 136 may be connected to the control SSP 112B via a voice trunk interface line 126 using a simplified message desk interface (SMDI) to allow the control SSP 112B to deliver calling parties and called parties to the voice mail system and to allow the voice mail system to instruct the control SSP 112B to set a message waiting indicator on a subscriber's telephone.

The voice mail system 136 typically includes a computer or collection of computers, recording and recording playback devices, and software for recording announcements for incoming calls, for recording and playing back recorded messages, and for receiving incoming calls and for making outgoing calls at the direction of the network. In addition to the recording and playback functionality, the voice mail system 136 includes text-to-speech (TTS) and speech-to-text (STT) synthesis devices and software for conversion of analog voice messages to digitized forms such as WAV files and MP3 files. The voice mail system 136 has memory capacity for saving announcements to incoming callers and for saving messages from incoming callers.

Operation

FIGS. 2A-2E provide a process flow for implementing the call monitoring service according to one embodiment of the present invention wherein any number of telecommunications units may be associated with the service and allowed to monitor calls routed to a network-based voice mail system from a control SSP associated with a subscriber. A process 200 is described herein with reference to the system 100 illustrated in FIG. 1, with the wireline telephone 124A being associated with the calling party, and the wireline telephones 124B and 124C, the wireless telephone 148A, and the IP phone 166A being associated with the simultaneous ring number designated by the subscriber. As described briefly above, the subscriber may utilize a voice activated administration system or a WWW site to provide the list of numbers that are to be simultaneously rung when a call directed to the simultaneous ring number is received. According to an embodiment of the present invention, the subscriber may specify multiple wireline, wireless, and VoIP telephone numbers. The list of numbers identified by the subscriber to be simultaneously rung is stored in the database 134. For instance, the subscriber may specify that the wireline telephones 124B and 124C, the wireless telephone 148A, and the IP phone 166A are to be rung simultaneously when an incoming communication is directed toward the subscriber's simultaneous ring number. The telephone numbers associated with the wireline telephones 124B and 124C, the wireless telephone 148A, and the IP phone 166A are stored in the database 134. Numbers of other telephones to be simultaneously rung may also be stored in the database 134. As will be described in greater detail below, when an incoming communication is received from the wireline telephone 124A directed toward the subscriber's simultaneous ring number, the wireline telephones 124B and 124C, the wireless telephone 148A, and the IP phone 166A will be rung simultaneously and will be allowed to monitor calls routed to the voice mail system 136, as described herein. Any number of other telephones identified by the subscriber may also be rung in a similar manner and allowed to monitor calls routed to the voice mail system 136. Of course, the calling party need not initiate the call from a wireline telecommunications unit, but instead may initiate the call from a wireless telecommunications unit or an IP telecommunications unit, where the associated MSC or VoIP gateway is provisioned to route the call request to the SSP associated with the subscriber's telecommunications unit.

In order to provision the call monitoring service of the present invention, a subscriber contacts her telephone services provider. According to one embodiment of the present invention, the subscriber may contact the telephone services provider via one of the telecommunications units associated with the subscriber using a feature code such as "*12" for allowing the subscriber access to the call monitoring services for activation of the service on each of the subscriber's telephone lines associated with the subscriber's simultaneous ring number. According to an alternative embodiment, the subscriber may contact the telephone services provider via an Internet-based website operated by the telephone services provider for allowing subscribers to access services such as the call monitoring service via a personal computer.

Once the subscriber is validated as being authorized to activate or deactivate the call monitoring service by requiring some form of identification such as a pass code from the subscriber, the control SSP 112B queries the SCP 132 for the current status of the call monitoring service. In response, an announcement may be played to the subscriber such as "call monitoring is on" or "call monitoring is off." A menu of options is provided to the subscriber to allow the subscriber to edit the current operating status of the call monitoring service on her telephone lines. For example, the subscriber may turn the call monitoring service on or off in response to a message such as "to activate the call monitoring service, press 1." If the subscriber selects to have the call monitoring service activated, then when an incoming call is not answered by the telecommunications units associated with the subscriber's simultaneous ring number, the call monitoring service is provided when the incoming call is passed to the voice mail system 136.

Figure 2A:
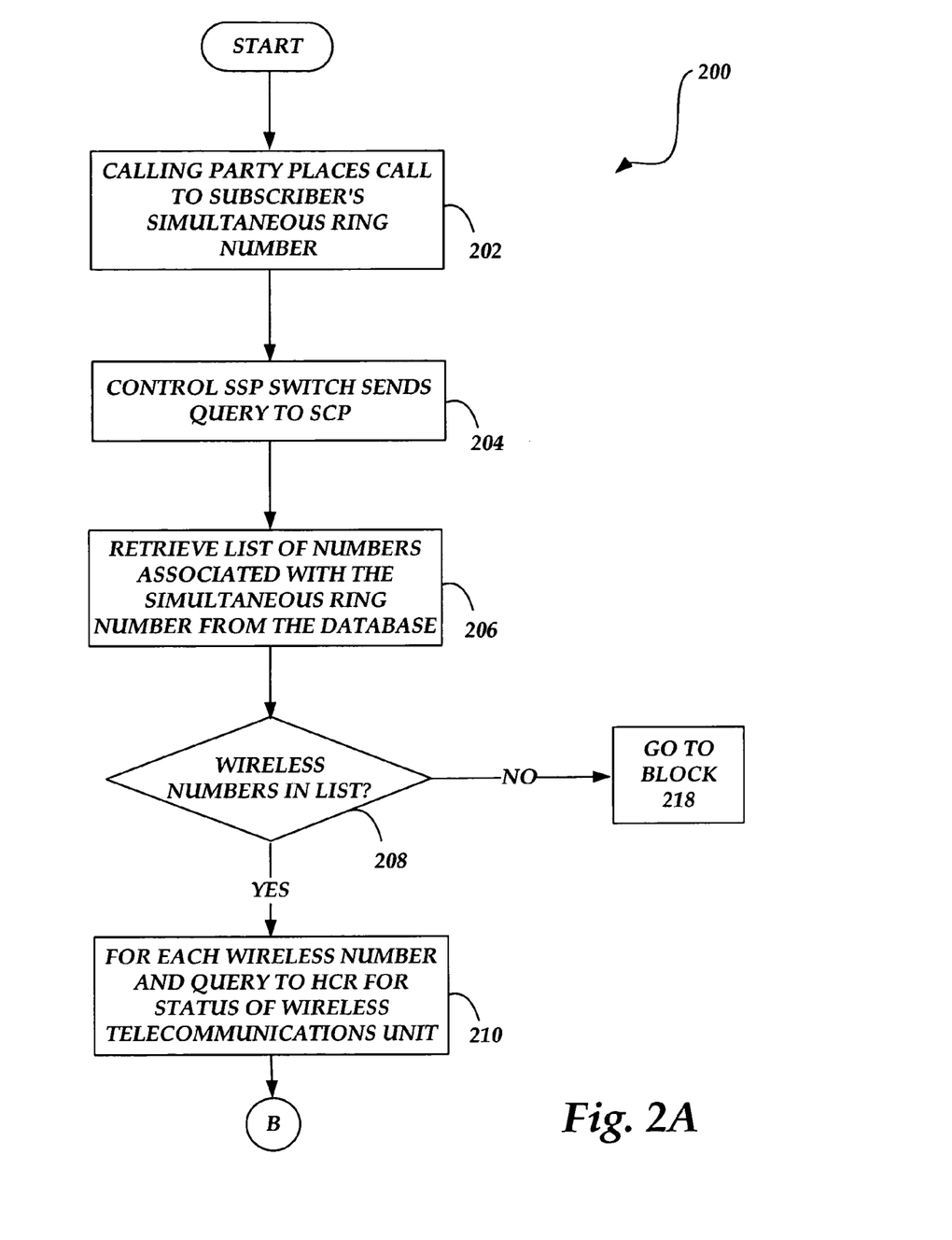
FIGS. 2A-2E are flow diagrams showing an illustrative process for providing a call monitoring service to multiple telecommunications units according to the disclosed embodiment of the present invention.

The process 200 begins at block 202 with the calling party placing a call to the simultaneous ring number associated with the called party, the called party being a subscriber of the call monitoring service. From block 202, the process 200 continues to block 204, where the control SSP 112B associated with the subscriber's simultaneous ring number has been provisioned with a Terminating Attempt Trigger ("TAT") specific to the simultaneous ring service for the subscriber that launches a TERMINATION_ATTEMPT query message to the SCP 132 upon receipt of the call request from the calling party. Upon receiving the query message, the SCP 132 retrieves, from the database 134, the list of numbers associated with the subscriber's simultaneous ring number to be simultaneously rung at block 206. The process 200 then continues to block 208, where the SCP 132 determines whether any numbers corresponding to wireless telephones are identified in the list of numbers to be simultaneously rung. If any wireless telephone numbers are contained in the list, the process 200 branches to block 210. At block 210, the SCP 132 queries the HLR 146 for the status of the wireless telecommunications units associated with each of the wireless telephone numbers identified in the list of numbers to be simultaneously rung. As described above, the SCP 132 may accomplish this by transmitting an IS-41 location request message to the HLR 146. It should be appreciated that the SCP 132 may transmit such messages to a variety of HLRs associated with the particular wireless telecommunications units.

From block 210, the process 200 continues to block 212. At block 212, responses are received at the SCP 132 from the queried HLR 146. These responses indicate the status of the wireless telecommunications units for which query messages were previously sent to the HLR 146 at block 210. In some situations, the HLR 146 may not respond to the request within a predetermined period of time. If the HLR 146 fails to respond in this predetermined period of time, the HLR 146 will be deemed to have timed-out.

From block 212, the process 200 continues to block 214, where a determination is made by the SCP 132 as to whether replies have been received in response to each of the query messages or whether the requests have timed-out. If all responses have not been received or have not timed-out, the process 200 returns to block 212 to wait for additional responses. If all the queries have been responded to or have timed-out, the process 200 continues from block 214 to block 216.

At block 216, the SCP 132 removes, from the list of numbers to be simultaneously rung, the numbers associated with the wireless telephones for which a response was received indicating that the telephone was unavailable or for which a response timed-out. In this manner, calls will not be set up directed to wireless telephones to which a communication could not be completed. From block 216, the process 200 continues to block 218. If, back at block 208, the SCP 132 determines that the list of numbers to be simultaneously rung does not include any wireless telephone numbers, then the process 200 proceeds directly to block 218.

Figure 2B:
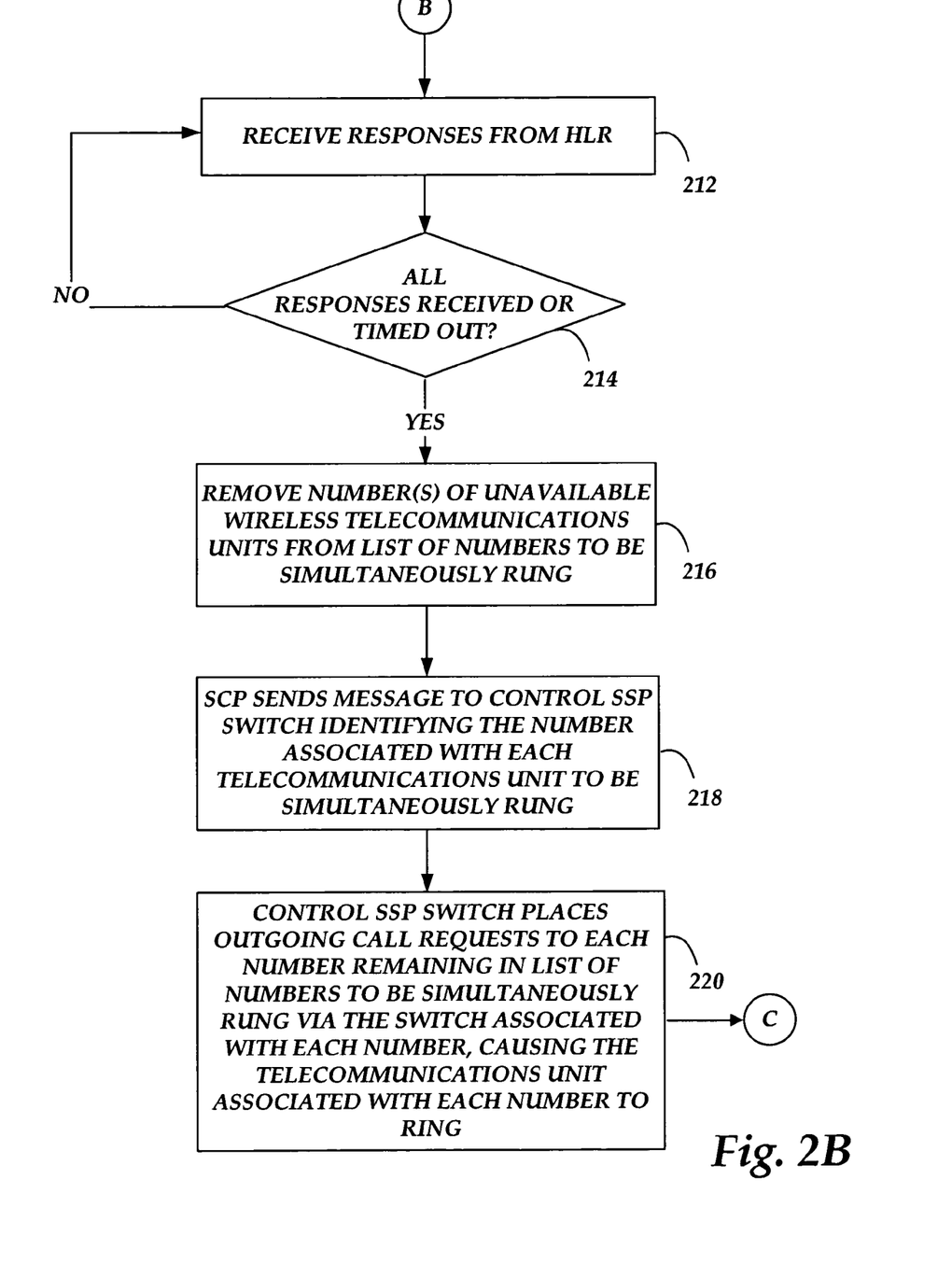

At block 218, the SCP 132 sends a message to the control SSP 112B identifying the number that was dialed by the calling party. In this instance, the control SSP 112B receives the subscriber's simultaneous ring number. The control SSP 112B uses this telephone number to look up the list of numbers that are to be simultaneously rung. Alternatively, the list of numbers may be part of the message that the control SSP 112B receives from the SCP 132. The process 200 then continues from block 218 to block 220. As will be described in greater detail below, the message from the SCP 132 is utilized by the control SSP 112B to set up call requests directed to each of the lines associated with the numbers to be simultaneously rung.

At block 220, the control SSP 112B places outgoing call requests to each of the numbers remaining on the list of numbers to be simultaneously rung. For instance, if the subscriber identifies the wireline telephones 124B and 124C, the wireless telephone 148A, and the IP phone 166A to be simultaneously rung, then the control SSP 112B places an outgoing call request to the wireline telephones 124B and 124C, the wireless telephone 148A, and the IP phone 166A. Typically, the call request to each of the telecommunications units associated with the numbers on the list will be routed from the control SSP 112B to a switch or gateway associated with each of the telecommunications units. In this instance, the SSP 112A will receive the outgoing call request directed to the wireline telephone 124B, the SSP 112C will receive the outgoing call request directed to the wireline telephone 124C, the MSC 142 will receive the outgoing call request directed to the wireless telephone 148A, and the VoIP gateway 162 will receive the outgoing call request directed to the IP phone 166A. The switch or gateway associated with each of the numbers receives the outgoing call request from the control SSP 112B and sends an appropriate indication to the telecommunications unit associated with each of the numbers, such as ringing the wireline and wireless telecommunications units or sending a Session Internet Protocol (SIP) invite message to the IP telecommunications units.

From block 220, the process 200 proceeds to block 222, where the control SSP 112B determines whether one of the outgoing call requests has been answered. If, at block 222, the control SSP 112B determines that one of the outgoing call requests has been answered, then the process branches to block 224, where the control SSP connects the calling party to the first answered telecommunications unit. The process 200 then continues to block 226, where the control SSP 112B drops the outgoing call requests to each of the unanswered telecommunications unit, and the process 200 ends at block 228.

If, back at block 222, the control SSP 112B determines that none of the outgoing call requests has been answered, the process 200 continues to block 230, where the control SSP 112B determines whether all the telecommunications units are busy. If all the telecommunications units are not busy, then the process 200 proceeds to block 232, where the control SSP 112B determines whether a predetermined time has passed since the outgoing call requests were placed without the calls being answered. If such a predetermined period of time has expired, the call requests are considered to have timed-out. If the predetermined period of time has not elapsed, then the process 200 returns to block 222, where the control SSP 112B again determines whether one of the call requests has been answered. If all the outgoing calls have timed-out at block 232, then the process 200 continues to block 234. If, back at block 230, the control SSP 112B determines that all of the telecommunications units are busy, then the process 200 continues to block 234.

Figure 2C:
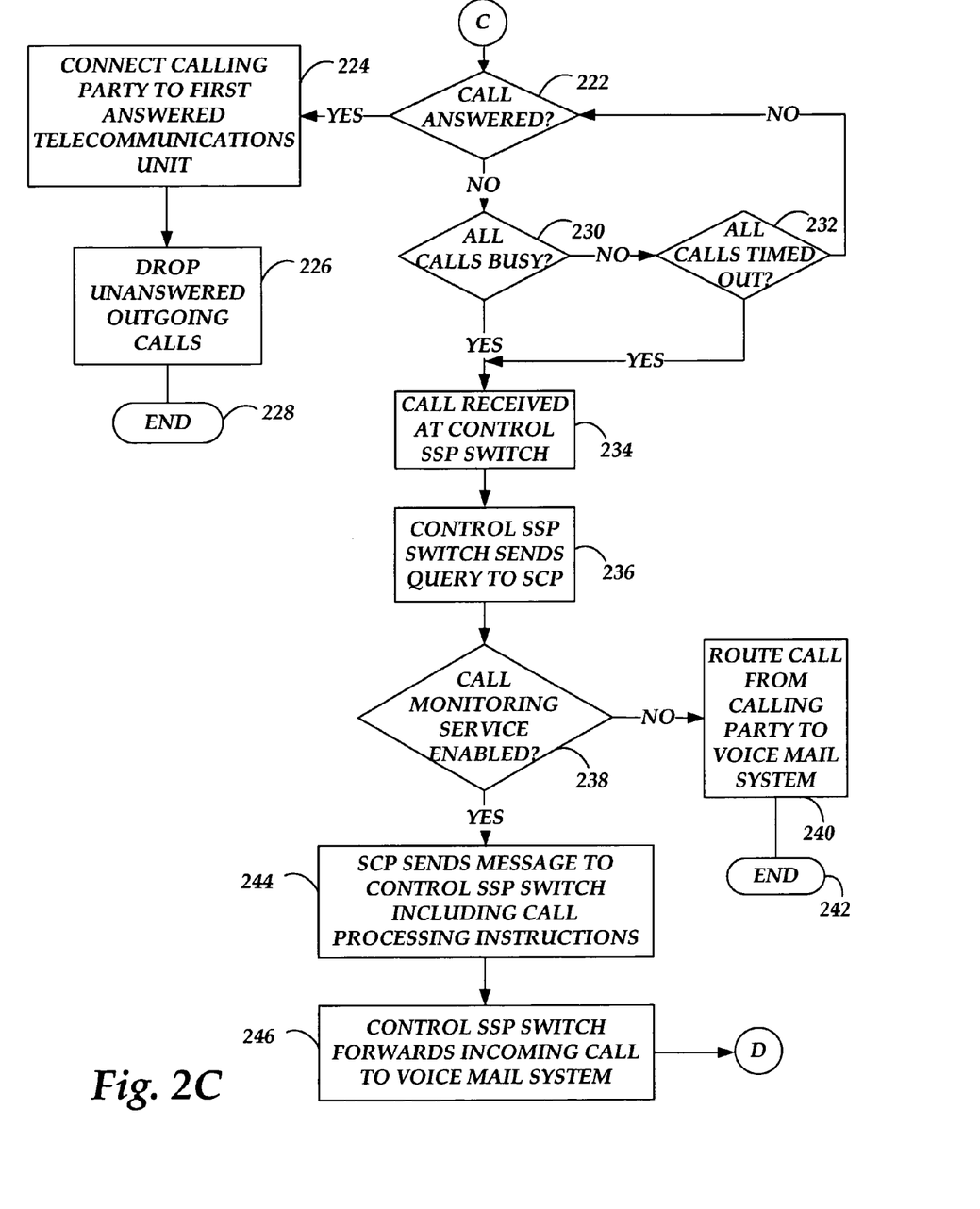

At block 234, the call from the calling party is received at the control SSP 112B for routing to the voice mail system 136. At block 236, because call monitoring has been provisioned for the subscriber, the routing of the call to the control SSP 112B for ultimate routing to the voice mail system 136 triggers a public office dialing plan (PODP) trigger for obtaining call monitoring services. As should be understood, other types of triggers such as a TAT may be used instead of the PODP trigger. According to a preferred embodiment, a single query, such as the PODP triggered query, is required to invoke the call monitoring functionality as described herein.

At block 238, the SCP 132 checks the call monitoring service status on the subscriber's simultaneous ring number. If the call monitoring service is disabled, the process 200 branches to block 240, where the control SSP 112B routes the call from the calling party directly to the voice mail system 136 without call monitoring treatment, and the process 200 ends at block 242. However, if at block 238, the SCP 132 determines that the call monitoring status is enabled, then the process 200 proceeds to block 244, where the SCP 132 collects information and call processing instructions and sends a message to the control SSP 112B including the information and call processing instructions. In one embodiment, the message from the SCP 132 includes the calling party's directory number, the subscriber's simultaneous ring number, and the voice mail system 136 directory number or access number. The control SSP 112B uses the subscriber's simultaneous ring number to look up the list of numbers associated with the simultaneous ring number. Alternatively, the list of numbers may be part of the message that the control SSP 112B receives from the SCP 132. The message from the SCP 132 may also include call processing instructions. Call processing instructions include how each of the telecommunications units associated with the subscriber's simultaneous ring number is to be notified when a communication is set up between the calling party and the voice mail system 136 and whether the subscriber is to be provided with instructions as to how to interrupt the call monitoring service to accept the call from the calling party as described herein.

Upon receiving the message from the SCP 132, the control SSP 112B forwards the incoming call to the voice mail system 136 and establishes a communication between the calling party and the voice mail system 136 at block 246. The process proceeds to block 248, where the voice mail system 136 receives the call and begins providing voice mail service to the calling party. Since call monitoring has been provisioned for the subscriber, as the voice mail system 136 provides voice mail service to the calling party, the voice mail system 136 provides notification messages to the control SSP 112B of the status of the call (i.e., playing an announcement to the calling party, recording message from the calling party, disconnecting call after message received, disconnecting call before message received, or forwarding call to another number) at block 250.

In response, at block 252, the control SSP 112B notifies each of the telecommunications units associated with the simultaneous ring number of the status of the communication between the calling party and the voice mail system 136 and of the option to monitor the communication between the calling party and the voice mail system 136. The telecommunications units may be notified via any appropriate signaling means. In one embodiment, the control SSP 112B may send a text message, such as a Short Message Service (SMS) message, to the telecommunications units, which may then be displayed at the telecommunications units for review by the users of the telecommunications units. In another embodiment, the control SSP 112B may notify the telecommunications units by sending a signaling message to the telecommunications units via the switches associated with the telecommunications units, causing the switches to provide a short or distinctive ring to each of the telecommunications units or to provide a distinctive dial tone when the telecommunications units go off hook. In yet another embodiment, the control SSP 112B may send an IP message to the telecommunications units via the gateways associated with the telecommunications units, which may then be displayed at the telecommunications units for review by the users of the telecommunications units. Moreover, the control SSP 112B may notify the telecommunications units by placing outgoing call requests to each of the telecommunications units.

A different type of signaling means may be provided to each of the telecommunications units. For instance, a SMS message may be provided to each of the wireless telecommunications units, while a signaling message which causes a distinctive ring to be applied may be provided to each of the wireline telecommunications units, and while an IP message may be provided to each of the IP telecommunications units. The subscriber may specify which signaling means should be provided to which telecommunications units. These specifications may be stored at the database 134 and included in the message sent from the SCP 132 to the control SSP 112B at block 244.

Figure 2D:
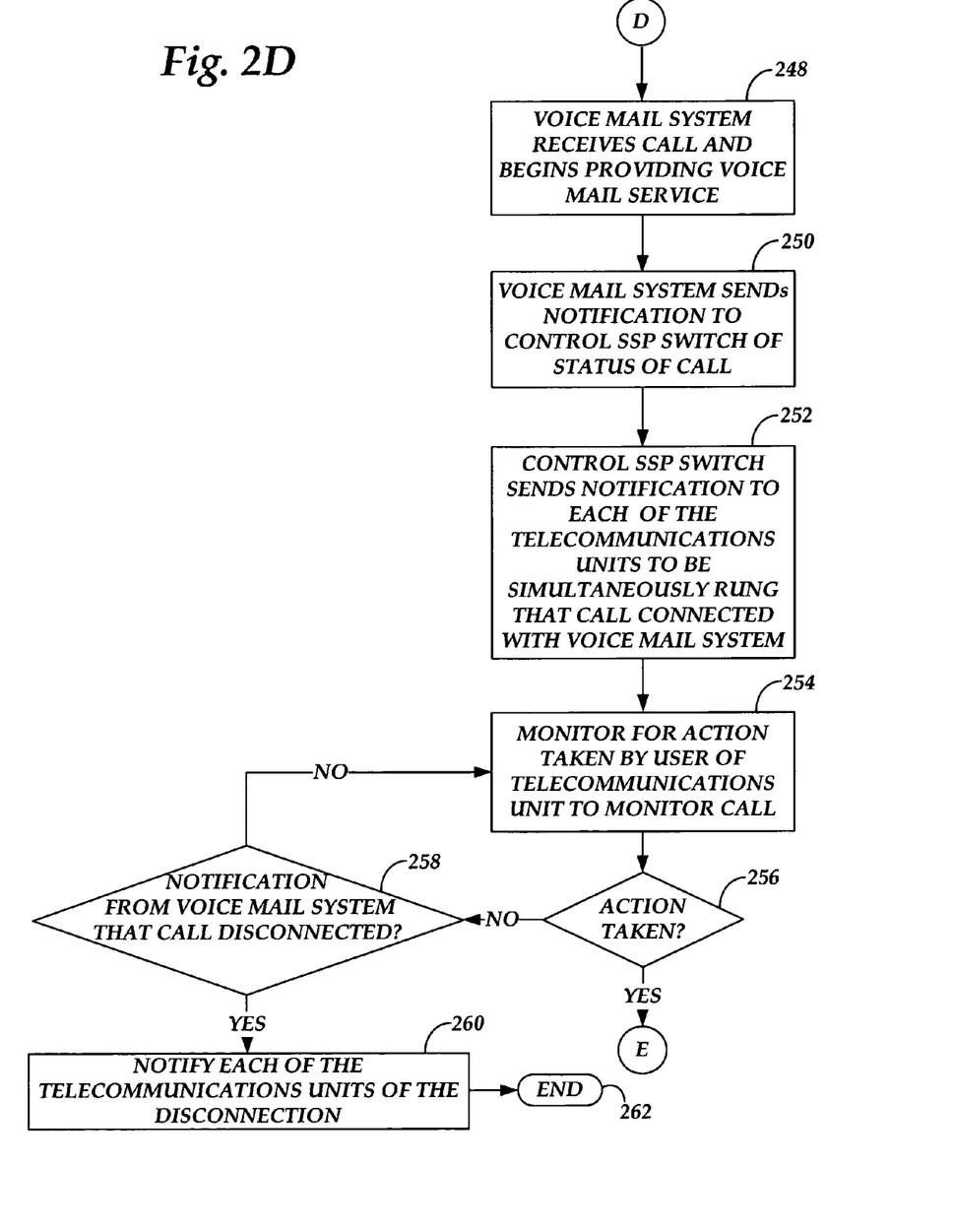

From block 252, the process 200 proceeds to block 254, where the control SSP 112B determines if a user at one of the telecommunications units has taken an action to connect to the communication between the calling party and the voice mail system 136 to monitor the call. This action may include going off hook and being automatically connected to the communication, dialing a special code or telephone number, selecting a specific button on the telecommunications unit, speaking a specific utterance to connect with the communication, or responding to a message from the control SSP 112B. For instance, in response to receiving a SMS message or an IP message, a user of one of the telecommunications units may send a response SMS message or a response IP message back to the control SSP 112B requesting to monitor the communication between the calling party and the voice mail system 136. In another embodiment, in response to receiving a short ring notification or a distinctive dial tone, the user may dial a special code or telephone number to connect with the communication. In yet another embodiment, in response to receiving an outgoing call request from the control SSP 112B, a user may go off hook and be automatically connected to the communication.

If, at block 254, the control SSP 112B determines that no action has been taken to connect to the communication between the calling party and the voice mail system 136, the process 200 proceeds to block 258, where the control SSP 112B determines if the voice mail system 136 has sent a notification that the communication between the calling party and the voice mail system 136 has disconnected. If, at block 258, the control SSP 112B determines that the communication between the calling party and the voice mail system has disconnected, then at block 260, the control SSP 112B notifies each of the telecommunications units of the disconnection via one of the signaling means discussed above, and the process ends at block 262. However, if back at block 258, the control SSP 112B determines that the voice mail system 136 has not sent a notification that the communication between the calling party and the voice mail system 136 has disconnected, then the process 200 returns to block 254, where the control SSP 112B determines if a user at one of the telecommunications units has taken an action to connect with the communication between the calling party and the voice mail system 136 to monitor the call.

If, back at block 256, the control SSP 112B determines that a user of one of the telecommunications units has taken an action to connect to the communication between the calling party and the voice mail system 136, the process 200 proceeds to block 264, where a communication is set up between the calling party, the voice mail system 136 and the telecommunications unit. Based on the action taken by a user, the request to monitor the communication between the calling party and the voice mail system 136 may be relayed to the control SSP 112B, which then sets up a communication between the telecommunications unit, the calling party, and the voice mail system 136, or may be relayed directly to the voice mail system 136, which then sets up the communication. As briefly discussed above, in response to receiving a SMS message or an IP message, a user of one of the telecommunications units may send a response SMS message or IP message back to the control SSP 112B requesting to monitor the communication between the calling party and the voice mail system 136. When the control SSP 112B receives the response SMS or IP message, the control SSP 112B recognizes the message as a request to monitor the communication between the calling party and the voice mail system 136 and places a call to the telecommunications unit requesting to monitor the communication and places a call to the voice mail system 136 via the directory number associated with the voice mail system 136 provided in the message from the SCP 132. The control SSP 112B also sends a notification to the voice mail system 136 to bridge the call from the control SSP 112B to the communication between the calling party and the voice mail system 136. When the user of the telecommunications unit answers the call from the control SSP 112B and the voice mail system 136 answers the call from the control SSP 112B, a communication between the telecommunications unit, the calling party, and the voice mail system 136 is set up.

In another embodiment, in response to receiving an outgoing call request from the control SSP 112B, a user may go off hook and be connected to the communication between the calling party and the voice mail system 136. When the control SSP 112B places the outgoing call request to the telecommunications unit, the control SSP 112B also places a call to the voice mail system 136 and sends a notification to the voice mail system 136 to bridge the call from the control SSP 112B to the communication between the calling party and the voice mail system 136. When the user of the telecommunications unit answers the call from the control SSP 112B and the voice mail system 136 answers the call from the control SSP 112B, a communication between the telecommunications unit, the calling party, and the voice mail system 136 is set up.

According to an alternative embodiment, the subscriber may subscribe to a distinctive ringing service whereby the subscriber may store and select a call monitoring directory number associated with a call monitoring service call from the control SSP 112B for presentation with a distinctive ring when a call from that number is received. As is known to those skilled in the art, distinctive ringing services allow a subscriber to select certain numbers for presentation with distinctive rings. For example, if the subscriber selects a close friend's telephone directory number as a distinctive ringing number, when the subscriber receives a telephone call from that telephone directory number, the subscriber is presented with a distinctive ring that alerts the subscriber to the identity of that calling party. According to an embodiment of the present invention, the subscriber may select the call monitoring service directory number associated with the control SSP 112B for treatment with a distinctive ring, which is stored in the database 134 and provided to the control SSP 112B in the message from the SCP 132 at block 244. When a telecommunications unit associated with the simultaneous ring number receives a call monitoring service call from the control SSP 112B, as described above, the user of the telecommunications unit will receive a distinctive ring to alert the user that the incoming call is a call monitoring service call. Moreover, the subscriber may select a caller identification name for the control SSP 112B, such as "call monitoring," which is stored in the database 134 and passed to the telecommunications unit when the control SSP 112B places a call to the telecommunications unit so that the user will recognizes that the call from the control SSP 112B is associated with the call monitoring service.

In yet another embodiment of the present invention, the voice mail system 136 may set up the communication between the telecommunications unit requesting to monitor, the calling party, and the voice mail system 136. For instance, in response to receiving a short ring notification or a distinctive dial tone, the user of a telecommunications unit may dial a special code or telephone number to connect with the communication between the calling party and the voice mail system 136, which causes the SSP 112B associated with the telecommunications unit to place a call to the voice mail system 136. The voice mail system 136 receives the call including the calling number information associated with the call and recognizes that the call is from a telecommunications unit that has been accorded the call monitoring service. In response to receiving the call, the voice mail system 136 connects the telecommunications unit to the communication between the calling party and the voice mail system 136.

Figure 2E:
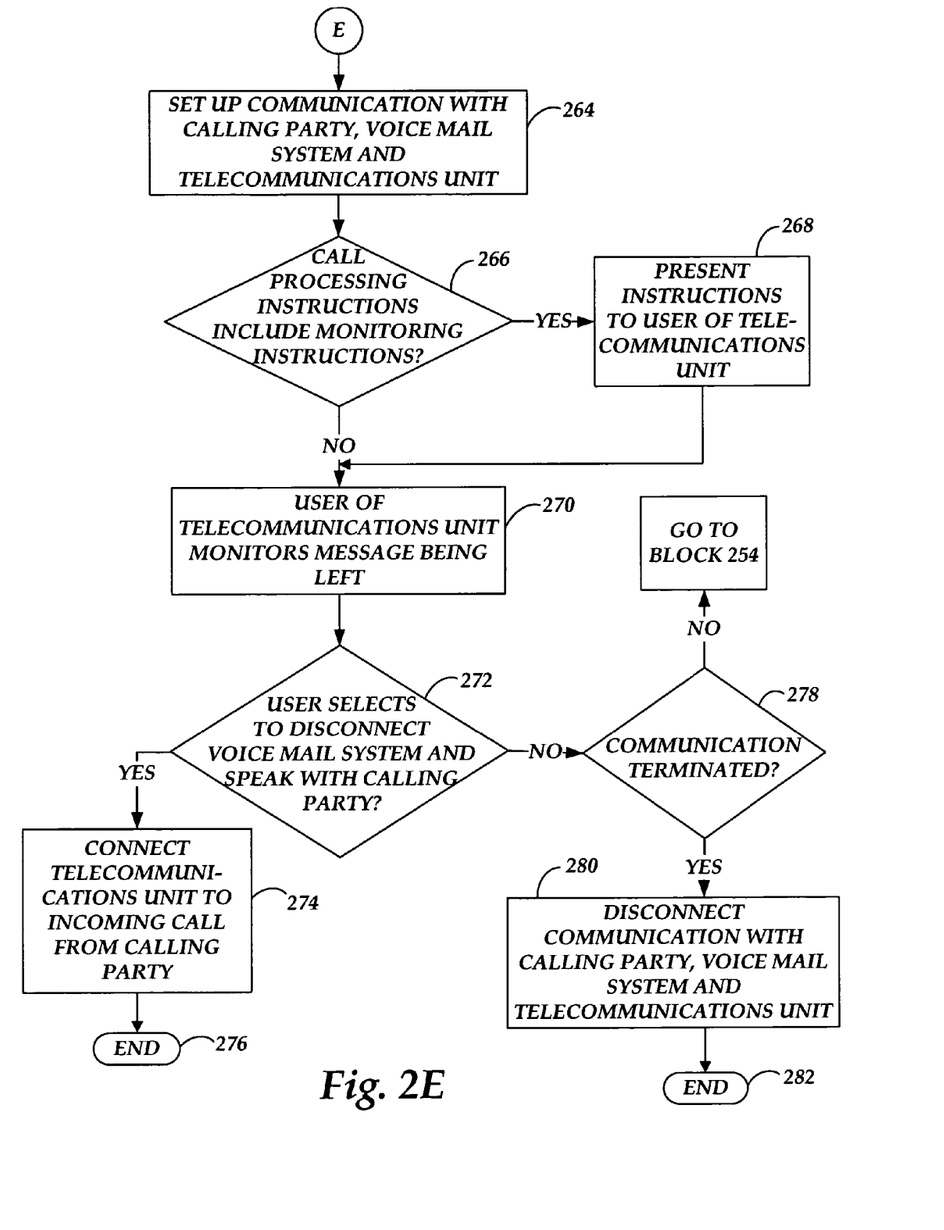

Once a communication between the telecommunications unit, the calling party, and the voice mail system 136 has been set up, the process 200 proceeds to block 266 where the control SSP 112B determines whether the call processing instructions provided in the message from the SCP 132 include monitoring instructions. If the call processing instructions contain monitoring instructions, then the process 200 branches to block 268, where the monitoring instructions are presented to the user of the telecommunications unit. According to an embodiment of the present invention, once the communication is set up, an announcement including the following options is provided to the user of the telecommunications: "to monitor the incoming message, press 1;" "to speak with the calling party while the voice mail service continues, press 2;" "to discontinue the voice mail service and speak with the calling party, press 3;" and "to disconnect the voice mail system from the call and speak with the calling party, press 4." If the user selects the last option, the control SSP 112B removes the voice mail system 136 from the communication between the telecommunications unit, the calling party, and the voice mail system 136. The control SSP 112B then may transfer the call between the telecommunications unit and calling party to the SSP associated with the telecommunications unit. In one embodiment, if the user selects the first or second option, the user may take further action such as dialing a special code, pushing a button on the telecommunications unit, or hanging up to disconnect from the communication, while maintaining the communication between the calling party and the voice mail system 136. If the user selects the third or fourth option, the voice mail system 136 may keep a record of the incoming call from the calling party including any voice mail message that was left, or the voice mail system 136 may delete the record of the incoming call along with any voice mail message that was left. From block 268, the process 200 proceeds to block 270, where the user of the telecommunications unit listens to the voice mail message being left by the calling party.

If, back at block 266, the control SSP 112B determines that the call processing instructions did not include monitoring instructions, the process 200 proceeds to block 270, where the user of the telecommunications unit immediately listens to the voice mail message being left by the calling party when the communication between the calling party, the voice mail system, and the telecommunications unit is set up.

From block 270, the process 200 proceeds to block 272, where a determination is made whether the user has selected to disconnect the voice mail system 136 from the communication and speak with the calling party. If the user has selected to disconnect the voice mail system 136 and speak with the calling party, then at block 274, the control SSP 112B removes the voice mail system 136 from the communication between the calling party, the voice mail system 136, and the telecommunications unit and connects the telecommunications unit to the incoming call from the calling party. The process 200 proceeds to block 276 and ends.

If, back at block 272, the user has not selected to disconnect the voice mail system 136 and speak with the calling party, the process 200 proceeds to block 278, where the voice mail system 136 determines whether the communication between the calling party, the voice mail system 136, and the telecommunications unit has been terminated. The communication may be terminated either because the calling party has disconnected from the communication or because the amount of time available for leaving a voice mail message has timed-out. If the communication has not been terminated, the process 200 returns to block 254, where the control SSP 112B determines if a user at one of the telecommunications units has taken an action to connect with the communication between the calling party and the voice mail system 136 to monitor the call. If a user of a second telecommunications unit associated with the subscriber's simultaneous ring number takes an action to connect to the communication between the calling party, the voice mail system 136, and the first telecommunications unit, a communication between the calling party, the voice mail system 136, the first telecommunications unit, and the second telecommunications unit will be set up. In an embodiment of the present invention, if the user of the second telecommunications unit selects to speak with the calling party, the voice mail system 136 connects the calling party to the second telecommunications unit and disconnects the first telecommunications unit from the communication. After disconnecting the first telecommunications unit, the voice mail system 136 may provide the user of the first telecommunications unit with an announcement such as "another party has accepted the call from the calling party, to join the call, press 1." If the user of the first telecommunications unit selects the join the call between the calling party and the second telecommunications device, the voice mail system 136 may play a short tone to the user of the second telecommunications device and the calling party to alert the parties that the user of the first telecommunications unit is connecting to the call.

If, on the other hand, the communication has been terminated, the process 200 proceeds from block 278 to block 280, where the control SSP 112B disconnects the communication between the calling party, the voice mail system 136, and the telecommunications unit, and the process 200 ends at block 282.

As described, methods and systems are provided for providing call monitoring service for multiple telecommunications units. It will be apparent to those skilled in the art that various modifications and variations may be made in the present invention without departing from the scope or spirit of the invention. Other embodiments of the invention will be apparent to those skilled in the art from consideration of the specification and practice of the invention described herein.

The invention claimed is:

1. A method of monitoring calls routed to a voice mail system, comprising:
receiving an incoming communication request from a calling party directed to a directory number of a subscriber, wherein the directory number is associated with a plurality of telecommunications units to be simultaneously rung;

placing outgoing communication requests to the plurality of telecommunications units, in response to the incoming communication request;

determining whether the incoming communication request should be forwarded to the voice mail system;

if the incoming communication request should be forwarded to the voice mail system, then dropping each of the outgoing communication requests and setting up a first communication between the calling party and the voice mail system;

providing a notification to each of the plurality of telecommunications units that the first communication between the calling party and the voice mail system has been set up;

receiving an indication from at least one telecommunications unit to connect with the first communication between the calling party and the voice mail system; and in response to receiving the indication from the at least one telecommunications unit, setting up a second communication between the calling party, the voice mail system, and the at least one telecommunications unit.

2. The method of claim 1, wherein setting up the second communication between the calling party, the voice mail system, and the at least one telecommunications unit includes allowing a user of the at least one telecommunications unit to listen to a voice message while the voice message is being recorded by the calling party into the voice mail system.

3. The method of claim 2, further comprising disconnecting the at least one telecommunications unit from the second communication between the calling party, the voice mail system, and the at least one telecommunications unit, wherein the calling party remains connected to the voice mail system.

4. The method of claim 2, further comprising:
providing instructions to the user of the at least one telecommunications unit for communicating with the calling party while the voice message is being recorded by the calling party into the voice mail system; and
connecting the calling party, the voice mail system, and the at least one telecommunications unit to allow the user of the at least one telecommunications unit to communicate with the calling party while the voice message is being recorded by the calling party into the voice mail system.

5. The method of claim 2, further comprising:
providing instructions to the user of the at least one telecommunications unit for interrupting the second communication between the calling party, the voice mail system, and the at least one telecommunications unit in order to accept the incoming communication from the calling party;
interrupting the second communication between the calling party, the voice mail system, and the at least one telecommunications unit; and
connecting the incoming communication request from the calling party and the user of the at least one telecommunications unit to allow a third communication between the calling party and the user of the at least one telecommunications unit.

6. The method of claim 5, wherein connecting the third communication includes transferring the third communication between the calling party and the at least one telecommunications unit away from the voice mail system.

7. The method of claim 1, wherein determining whether the incoming communication request should be forwarded to the voice mail system includes determining whether at least one of the outgoing communication requests is answered.

8. The method of claim 1, wherein the plurality of telecommunications units includes wireline, wireless, and Internet Protocol telecommunications units.

9. A system for monitoring calls routed to a voice mail system, comprising:
programmable service means operative to:
receive an incoming communication request from a calling party directed to a directory number of a subscriber, wherein the directory number is associated with a plurality of telecommunications units to be simultaneously rung;
place outgoing communication requests to each of the plurality of telecommunications units, in response to the incoming communication request;
determine whether the incoming communication request should be forwarded to the voice mail system;
drop each of the outgoing communication requests and query a programmable determination means for call monitoring services if the incoming communication request should be forwarded to the voice mail system;
the programmable determination means operative to:
provide call monitoring instructions to the programmable service means; and
the programmable service means further operative to
set up a first communication between the calling party and the voice mail system;
provide a notification to each of the plurality of telecommunications units that the first communication between the calling party and the voice mail system has been set up;
receive an indication from at least one telecommunications unit to connect with the first communication between the calling party and the voice mail system; and
set up a second communication between the calling party, the voice mail system, and the at least one telecommunications unit in response to receiving the indication from the at least one telecommunications unit.

10. The system of claim 9, wherein the programmable service means is further operative to query the programmable determination means for processing instructions for the incoming communication request.

11. The system of claim 10, wherein the programmable determination means is further operative to provide the processing instructions for the incoming communication request to the programmable service means, wherein the processing instructions include directions to place outgoing communication requests to each of the plurality of telecommunications units to be simultaneously rung.

12. The system of claim 9, wherein the programmable service means is further operative to allow a user of the at least one telecommunications unit to listen to a voice message while the voice message is being recorded by the calling party into the voice mail system.

13. The system of claim 12, wherein the programmable service means is further operative to disconnect the at least one telecommunications unit from the second communication between the calling party, the voice mail system, and the at least one telecommunications unit, wherein the calling party remains connected to the voice mail system.

14. The system of claim 12, further comprising:
the voice mail system operative to:
provide instructions to the user of the at least one telecommunications unit for communicating with the calling party while the voice message is being recorded by the calling party into the voice mail system; and connect the at least one telecommunications unit to the communication between the calling party and the voice mail system to allow the user of the at least one telecommunications unit to communicate with the calling party while the voice message is being recorded by the calling party into the voice mail system.

15. The system of claim 12, further comprising:

the voice mail system operative to:

provide instructions to the user of the at least one telecommunications unit for interrupting the second communication between the calling party, the voice mail system, and the at least one telecommunications unit in order to accept the incoming communication from the calling party;

interrupt the second communication between the calling party, the voice mail system, and the at least one telecommunications unit; and connect the incoming communication request from the calling party to the at least one telecommunications unit to allow a third communication between the calling party and the user of the at least one telecommunications unit.

16. The system of claim 9, wherein the programmable service means is a switch and wherein the programmable determination means is a service control point.

17. A method for providing a call monitoring service, comprising:

receiving an incoming communication request from a calling party directed to a directory number of a subscriber, wherein the directory number is associated with a plurality of telecommunications units to be simultaneously rung;

placing outgoing communication requests to the plurality of telecommunications units;

determining whether the incoming communication should be forwarded to a voice mail system;

if the incoming communication should be forwarded to the voice mail system, then dropping each of the outgoing communication requests and setting up a first communication between the calling party and the voice mail system;

calling each of the plurality of telecommunications units;

if at least one of the calls to the plurality of telecommunications units is answered, then setting up a second communication between the calling party, the voice mail system, and the answered telecommunications unit.

18. The method of claim 17, wherein setting up a second communication between the calling party, the voice mail system, and the at least one telecommunications unit includes allowing a user of the at least one telecommunications unit to listen to a voice message while the voice message is being recorded by the calling party into the voice mail system.

19. The method of claim 17, further comprising after calling each of the plurality of telecommunications units, providing each of the plurality of telecommunications units a calling party identification associated with the call monitoring service to alert a user of each of the plurality of telecommunications units that the call is associated with the call monitoring service.

20. The method of claim 17, further comprising after calling each of the plurality of telecommunications units, providing each of the plurality of telecommunications units a distinctive ring to alert a user of each of the plurality of telecommunications units that the call is associated with the call monitoring service.

* * * * *